United States Patent [19]

Cochrane

[11] Patent Number: 4,744,708

[45] Date of Patent: May 17, 1988

[54] COIL MEMBER RESTRAINING BARRIER AND CARRYING VEHICLE

[75] Inventor: Richard B. Cochrane, Transvaal, South Africa

[73] Assignee: Cochrane Steel Products (Proprietary) Limited, Johannesburg, South Africa

[21] Appl. No.: 842,233

[22] Filed: Mar. 21, 1986

[30] Foreign Application Priority Data

Mar. 25, 1985 [ZA] South Africa .................... 85/2212

[51] Int. Cl.$^4$ ................ E04H 17/26; E04H 17/04
[52] U.S. Cl. ........................... 410/47; 256/1; 256/2; 256/33; 242/86.6; 410/42
[58] Field of Search .................. 410/31, 32, 36, 39, 410/42, 47, 48, 49; 256/1, 32, 33, 2, 6, 8; 242/86.6, 129

[56] References Cited

U.S. PATENT DOCUMENTS

| 2,801,080 | 7/1957 | Jee | 256/2 |
| 2,908,484 | 10/1959 | Uhl | 256/3 |
| 3,070,946 | 1/1963 | Kirsch et al. | 256/2 X |
| 3,155,374 | 11/1964 | Sieffert | 256/33 X |
| 3,263,830 | 8/1966 | Anderson | 410/36 |
| 3,902,612 | 9/1975 | Hall | 410/48 X |
| 3,972,510 | 8/1976 | Dougherty | 256/11 |
| 4,099,617 | 7/1978 | Nist, Jr. | 410/36 X |
| 4,119,301 | 10/1978 | Payne | 256/41 |
| 4,367,059 | 1/1983 | Stubbins | 410/49 X |
| 4,484,729 | 11/1984 | Mainiero et al. | 256/2 X |

FOREIGN PATENT DOCUMENTS

| 1215029 | 4/1966 | Fed. Rep. of Germany | 256/1 |
| 541916 | 12/1941 | United Kingdom . | |
| 2023513 | 1/1980 | United Kingdom | 410/36 |

Primary Examiner—Johnny D. Cherry
Assistant Examiner—Scott H. Werny

[57] ABSTRACT

A barrier which is extensibly deployed from a vehicle and which includes at least three coils of barbed tape supported and spaced from one another with an upper coil located above two lower coils. The coils are spaced parallel from one another, and are supported, by transverse rods located along the respective lengths of the coils. Each coil is a plurality of short coils which are interconnected in axial alignment in head-to-tail relation, with adjacent short coils having oppositely directed senses of rotation to counterbalance any net rotational forces produced by each short coil.

9 Claims, 2 Drawing Sheets

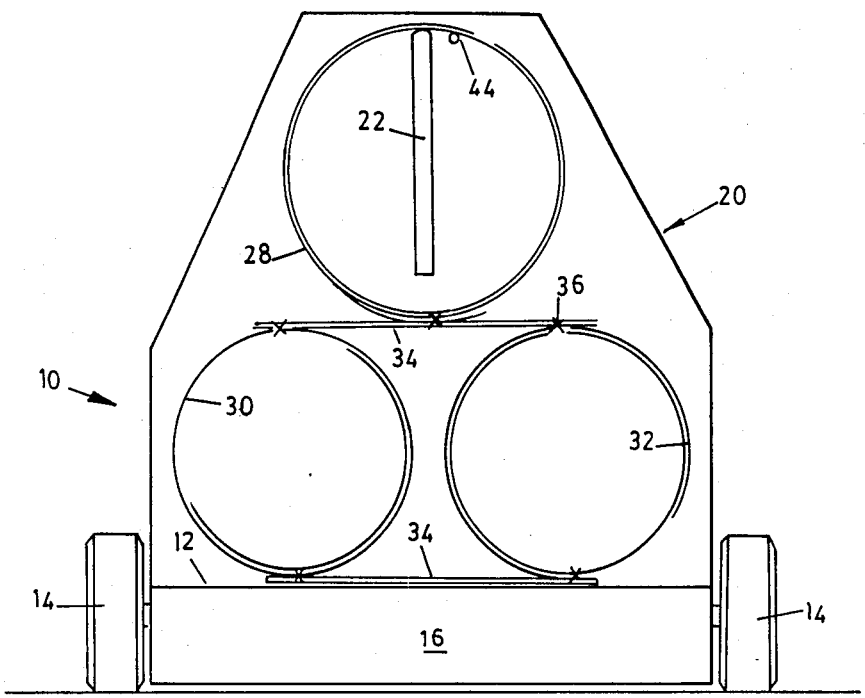
FIG_1
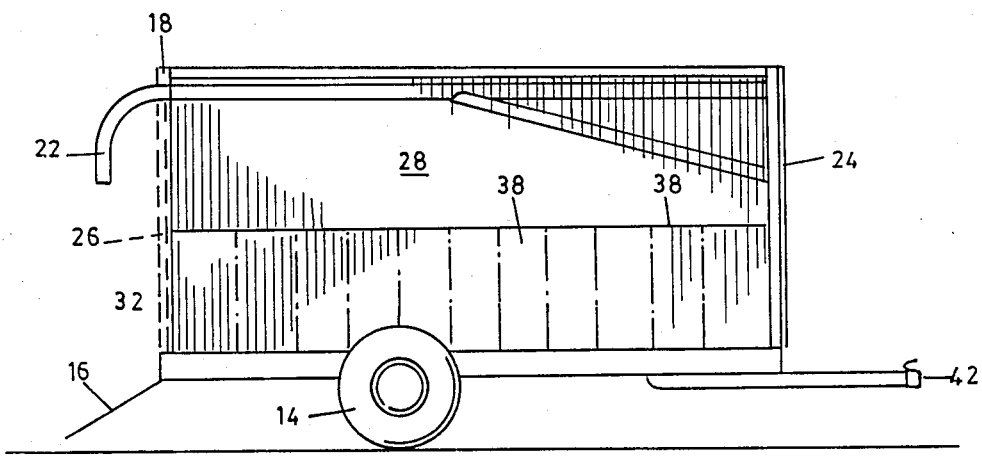
FIG_2

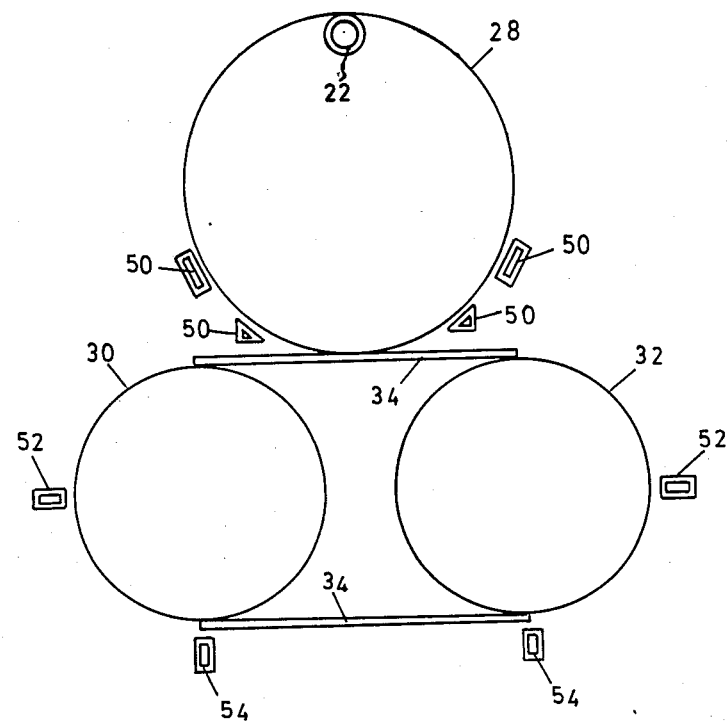
FIG_3

COIL MEMBER RESTRAINING BARRIER AND CARRYING VEHICLE

BACKGROUND OF THE INVENTION

This invention relates to a barrier which is transportable and which is easily erected and removed and which offers a substantial deterrent effect

SUMMARY OF THE INVENTION

The invention provides a barrier which includes at least two coils of suitable material which are axially extensible so that the axial directions of the coils extend in a parallel direction to one another, and a plurality of support devices which interconnect the coils and which maintain the coils spaced from one another.

Two, or three, of the coils, in use, may lie on the ground. However, in a preferred form of the invention at least one coil, in use, is supported in an elevated position above the ground. Thus the invention extends to a barrier which includes at least three coils of suitable material which are extensible substantially parallel to one another, and a plurality of support devices interconnecting the coils which are positioned with one coil above the remaining two coils.

The upper coil may be centrally positioned relative to the two lower coils.

The support devices may be of any suitable shape. In one example of the invention the support devices comprise a plurality of elongate rods, for example of a high tensile steel, which are connected to the coils at strategic points. Some of the rods may however be insulating, e.g. have an insulating sleeve of nylon or the like to isolate at least one coil, say the uppermost coil, from the ground. This enables the isolated coil to be electrified and the effectiveness of the barrier to be increased.

In one arrangement of the invention the rods are used to interconnect the two coils at lower and upper ends with the coils being spaced from one another. The upper coil may then be secured to the rods at the upper ends of the two lower coils.

Means may be provided to restrain or prevent the coils from being extended excessively. This means may comprise, in a simple form of the invention, a cable or the like which is fixed to one of the coils. For example a cable may be fixed inside the upper coil.

Each of the coils may be formed by interconnecting a plurality of relatively short coils. To counter tendencies of the composite coils to rotate or deform by forces arising from the resilience of the materials used in constructing the coils, adjacent coils may be rotated through 180° relatively to each other. In this way adjacent short coils have oppositely directed senses of rotation and forces set up by a first coil in a first direction are effectively counteract by corresponding forces set up by a second, adjacent, coil acting in an opposed direction.

As indicated the coils may be made of any suitable material. A preferred material is security wire such as barbed tape or the like. The coils are initially in the form of helices but preferably, adjacent windings of the coils are interconnected at predetermined positions and provide structures which, when extended, are more tube-like than helical.

The invention also extends to a vehicle which includes a loading platform and a barrier of the kind described located on the loading platform with the coils in a compressed state. The barrier may be located on a loading platform of the vehicle.

The vehicle may include a cantilevered support which extends through the uppermost coil and which supports it. The support may include a free end which is curved smoothly outwardly and downwardly. Alternatively or additionally, one or more coils may be supported by beams, guides or the like which are positioned on the outside of the coil or coils. This feature enables the quantity of the coils, which are stored, to be increased, and hence a longer barrier can be deployed from a single vehicle. If the upper coil is to be electrified then the cantilevered support, or the beams, as the case may be, may be insulated so that the upper coil does not make electrical contact with the vehicle. The means for electrifying the coil can then be carried on the vehicle and it is possible to deploy the barrier with the upper coil electrified.

One end of the barrier may be anchored to the vehicle and an opposed end of the barrier may be anchored to a component of the vehicle e.g. a tail gate which is removable from the vehicle.

The barrier may also be completely detachable from the vehicle.

The vehicle may include removable sides thereby to provide access to the interior of the vehicle. These sides, or permanent sides, may provide support for the coils but a similar function may be provided by beams or guides, on the vehicle, which effectively replace the sides.

The vehicle may be self-powered, or may be a drawn vehicle such as a trailer, or may be manually movable.

The invention also provides a method of erecting a barrier which includes the steps of providing a barrier of the kind described in a compressed state on a vehicle, anchoring one end of the barrier at a desired location and advancing the vehicle thereby to feed out the barrier from the vehicle in an extended state.

BRIEF DESCRIPTION OF THE DRAWINGS

The invention is further described by way of example with reference to the accompanying drawings in which:

FIG. 1 is an end view of a vehicle which includes a barrier according to the invention, FIG. 2 is a side view of the vehicle of FIG. 1, and FIG. 3 shows an alternative support system for the barrier.

DESCRIPTION OF PREFERRED EMBODIMENT

FIGS. 1 and 2 of the accompanying drawings illustrate a vehicle which includes a barrier according to the invention.

The vehicle, in this example, is a trailer 10 and includes a loading platform 12 which is mounted on a chassis supported by wheels 14.

At its rear end the loading platform 12 terminates in a ramp 16 which extends smoothly downwardly. Alternatively the ramp could be curved outwardly and downwardly.

Mounted on the platform 12 is a framework 18 which extends upwardly. Sides 20 are securable to the framework in any suitable manner and difine an enclosure over the loading platform 12. At least the upper side sections may be detachable from the framework.

A cantilevered support 22 extends from a forward end of the trailer to a rear end in an upper region of the enclosure. Referring to FIG. 2, the cantilevered support at its forward end, i.e., the right hand side of FIG. 2 is approximately 30 mm lower than at the left hand end. The slope of the support may be varied, by means of an adjusting screw, not shown, to enable an optimum deploying orientation to be obtained.

The trailer at its forward end includes an end wall 24 and at its rear end a detachable tail gate 26.

Located inside the enclosure on the trailer are three coils 28, 30 and 32 respectively. Each coil is made from barbed tape or the like. The coil 28, which is uppermost, has a slightly larger diameter than the coils 30 and 32 which are lowermost and which are located side by side. The ratio of the diameter of the upper coil to the diameter of each of the lower coils is approximately 9 to 7.3; this ratio having been established as giving efficient operation of the barrier in use.

The two lowermost coils 30 and 32 are inteconnected and spaced by means of a plurality of rods 34 which are made from high tensile steel. The rods are secured to the coils by means of clips 36 which are crimped in position. The rods 34 interconnect the lower and upper ends of the coils 30 and 32 and space these coils to prevent their entanglement. The upper coil 28 is secured to the upper rods 34.

Each of the coils 28 to 32 is formed from a plurality of smaller coils 38, which are interconnected in axial alignment, see FIG. 2. The coils 38 are substantially identical but are turned through 180° relatively to one another prior to interconnection so that, in effect, adjacent short coils have oppositely directed senses of rotation so that any net rotational forces produced by a coil 38 are counterbalanced by those produced by an adjacent coil 38. Each of the individual coils 38, particularly when extended in the longitudinal direction, exerts forces due to the natural resilience of the material. These forces generally have a net component in one direction and, in order to balance or compensate for these forces, the coils 38 are arranged in opposite directions so that the net forces produced by one coil are substantially counteracted by the net forces produced by an adjacent coil, and so on.

The coils 38, initially, have helical windings. To make the extended coils more "tube-like", which increases the effectiveness of the barrier, adjacent windings of the coils are interconnected at predetermined positions in such a way that the coils are still compressible and expansible.

The barrier of the invention is designed to be deployed at locations which temporarily require a high degree of security. The trailer is attached to a tow vehicle by means of a hitch 42 and towed to the location when required. The tailgate 26 is removed from the trailer and placed flat on the ground. In a variation of the invention the tailgate is released from the vehicle by means of a cable and lever mechanism which is operated remotely, e.g. from the cab of the vehicle. This carries the benefit of safer and easier deployment. In so doing the first few coils of the barrier are withdrawn from the trailer in a partly extended condition. The vehicle is then driven in a predetermined direction, at a slow speed, and the coils on the trailer are payed out as the trailer advances. The coils are extended in the process and assume a predetermined stretched quasi-tubular form having a maximum degree of elongation which is controlled inter alia by a cable 44 which is fixed inside the uppermost coil 28. The cable is substantially inextensible and consequently determines the maximum degree of elongation of the coils.

Once the contents of the trailer have been discharged, the tow vehicle is disconnected from the trailer. The trailer therefore itself forms part of a barrier. It is possible though for the trailer to be removed from the now-deployed set of coils. Additional trailers may be used in similar fashion to increase the length of the barrier.

These detachable sides 20, when removed, provide access to the interior of the enclosure and enable the coils to be repacked on to the trailer, when necessary. Also should the coils for one or other reason become snagged due to the barbs thereon they can be manually manipulated. However it has been established through use that snagging does not often occur for the coils are effectively spaced from one another in a controlled manner by the supporting rods 34 and by the cantilevered support 22.

When it is necessary to reload the coils on to the trailer the trailer is moved in the reverse direction and the coils are manually manipulated into position. The smooth outer end of the cantilevered support 22 assists the loading process as does the ramp 16. The natural resilience of the material also makes the loading process easy.

The coils inside the closure are supported inter alia by the cantilevered support 22 and by the sides of the trailer. As the length of the support 22 is, for practical reasons, limited, it follows that the maximum length of the barrier is largely determined by the length of the support 22. For extra long barriers the support 22 may be replaced, or at least be supplemented, by beams 50 in the manner shown in FIG. 3. The beams 50 support the uppermost coil 28 on its outer lower surface, in the nature of a cradle. The beams 50 may themselves be supported, along their lengths, directly from the trailer in such a way that they do not impede the free movement of the coils from or onto the trailer. Thus the beams 50 can be made to extend to the full length of a trailer and consequently the length of the barrier is, in this embodiment, eventually determined by the maximum permissible trailer length.

Similarly the sides and bottom of the trailer, shown in FIGS. 1 and 2, which provide direct support for the lowermost coils 30 and 32 can be replaced by side beams 52 and bottom beams 54 respectively.

The modifications described in connection with FIG. 3 make it possible for the trailer to be made largely from tubing and for the sheet metal sides of the trailer of FIGS. 1 and 2 to be dispensed with. The resulting construction is lighter and therefore less expensive and, as has been pointed out, it is possible to deploy barriers of substantially increased length with a trailer of the FIG. 3 construction.

The invention has been described principally with reference to a pyramid-type structure of three coils. However it falls within the scope of the invention to deploy only two coils or three coils, which all are adapted to lie on the ground, i.e. to provide a barrier, the width of which is substantially greater than its height.

Another variation is to isolate one coil, say the upper coil 28, from the other coils and the supporting structure and to electrify it. This is achieved by placing insulating sleeves over the rods 34, which support the upper coil, and over the support 2 and the guides 50, as the case may be. The upper coil can then be electrified by means of equipment which is similar to that used for electrifying fences, and which is carried on the vehicle, and the barrier can in fact be deployed from the vehicle in an electrified state.

The barrier may also be completely detachable from the deploying vehicle. Thus one end of the barrier may be attached to a suitable frame, and the other end to structure which in use forms a tail gate of the vehicle. Compressed barriers may be stored at a suitable location and transferred as needed to the deploying vehicle. Each barrier is deployed in the manner described and is completely detached from the vehicle after deployment. The vehicle is then available for reloading with another barrier in the compressed state. The deployed barriers may be fixed to each other by interconnecting the adjacent tailgates and frames, which are provided with suitable fastening means for this purpose.

I claim:

1. A barrier which includes at least two adjacent compressed coils of suitable material which are axially extensible so that the axial directions of the coils extend in a spaced parallel direction to one another, and a plurality of support devices which provide connection between the coils at a plurality of locations along their respective lengths and space the coils outside of one another thereby to prevent entanglement between coils, each coil comprising a plurality of short coils which are interconnected in axial alignment in head-to-tail relation with adjacent short coils having oppositely directed senses of rotation so that any net rotational forces produced by each short coil are counterbalanced.

2. A barrier according to claim 1 wherein, in use, at least one coil is supported in an elevated position above the ground, and two lower coils lie on the ground.

3. A barrier according to claim 2 wherein support devices interconnect the two lower coils at lower and upper ends respectively with the coils being spaced from one another, the upper coil being secured to the support devices which are connected to the upper ends of the lower coils.

4. A barrier according to claim 1 wherein the support devices comprise a plurality of elongate rods.

5. A barrier according to claim 1 which includes means to determine the maximum degree of elongation of the coils.

6. A barrier according to claim 1 wherein the coils are formed from barbed tape.

7. The combination of a barrier and a vehicle,
said barrier including at least two adjacent compressed coils of suitable material which are axially extensible so that the axial directions of the coils extend in a spaced parallel direction to one another, and a plurality of support devices which provide connection between the coils at a plurality of locations along their respective lengths and space the coils outside of one another thereby to prevent entanglement between coils, each coil comprising a plurality of short coils which are interconnected in axial alignment in head-to-tail relation with adjacent short coils having oppositely directed senses of rotation so that any net rotational forces produced by each short coil are counterbalanced, one of said coils being an uppermost coil,
said vehicle including elongate means supporting said uppermost coil of said barrier.

8. The combination of a barrier and a vehicle according to claim 7 wherein said elongate means comprises a cantilevered support which extends through said uppermost coil to support it.

9. The combination of a barrier and a vehicle according to claim 7 wherein said elongate means comprises at least two elongate beams which are positioned below and on opposite sides of said uppermost coil to support the coil.

* * * * *